United States Patent Office 3,409,412
Patented Nov. 5, 1968

3,409,412
PROCESS FOR PRODUCING BUTTERFLY TWIN BARIUM TITANATE SINGLE CRYSTALS AND BARIUM TITANATE MIXTURE USED THEREIN
Hiromu Sasaki, Osaka-shi, Osaka-fu, Japan, assignor to Matsushita Electric Industrial Co., Ltd., Osaka, Japan
No Drawing. Filed Dec. 8, 1965, Ser. No. 512,511
Claims priority, application Japan, Dec. 28, 1964, 40/40
4 Claims. (Cl. 23—300)

This invention relates to an improved method for growing barium titanate single crystals having a so-called butterfly wings-shaped habit and more particularly to compositions of barium titanate powders as a starting material.

Barium titanate is a well-known ferroelectric material which is particularly well suited for use in a memory device utilizing its rectangular hysteresis loop characteristic. (Electrical Engineering, volume 71, pages 916–922, November 1952; I.R.E. Transactions on Component Parts, volume CP–3, pages 3–11, March 1956.)

It is also well known that barium titanate is crystallized in the form of either thin plate or chunky cube during a slow cooling of its molten solution with a flux such as potassium fluoride. The thin plate crystals have a right-angled triangular shape, the hypotenuse of two plates being joined in a twin form; the angle is approximately 40 degrees. This pair looks like butterfly wings; hence it is called "butterfly" twin crystal.

The preparation method for the barium titanate twin crystals was reported by J. P. Remeika in the Journal of the American Chemical Society, vol. 76, pages 940–941, 1954. The first step in this procedure consists of introducing barium titanate powder into a platinum crucible and covering the powder with potassium fluoride, which is a solvent for barium titanate at an elevated temperature. The barium titanate powder and the flux in the crucible are then heated to a temperature in the range of from approximately 1100° C. to 1200° C. and soaked at such temperature for 8 hours. The amount of flux relative to the barium titanate powder is chosen in such manner as to assure the presence of undissolved barium titanate at the end of the soaking period. The crucible and its contents are then cooled at a rate in the range of 10 to 30° C. per hour. The barium titanate twin crystals grow in size during the cooling procedure. Decantation of the molten flux at a temperature in the range of from 850° C. to 900° C. is necessary for preventing the twin crystals from deterioration due to solidification of the flux contacting with them. The decantation temperature should be a little higher than the eutectic temperature of the barium titanate-potassium fluoride system. The crystals left in the crucible are then cooled slowly to room temperature.

An inherent disadvantage of the Remeika process is the fact that the yield of the barium titanate twin crystals varies over a wide range. This disadvantage was improved by J. W. Nielsen et al. (Journal of the American Ceramic Society, vol. 45, pages 12–17, Jan. 1962). The Nielsen method is characterized by removing substantially all the barium titanate particles larger than 6 microns prior to their introduction into the flux material such as potassium fluoride and produces a high twin yield when the average particle size is approximately 1 micron with a rather sharp cutoff in the distribution in the large-particle region. The Nielsen method comprises a strict control of particle size distribution of starting barium titanate powder and an additional procedure of grinding which is liable to contaminate the starting material. Minor impurity is known to decrease the yield.

It is an object of this invention to provide an improved process for the preparation of sizable butterfly twin crystals of barium titanate in a high yield based on the Remeika method, employing no particle size control.

It is another object of the invention to eliminate additional grinding procedure which may contaminate the starting powders.

It has been discovered according to the present invention that the molar ratio of barium oxide to titanium dioxide in the starting barium titanate powder has a substantial effect on the yield of butterfly twins. The essential features of the present inventive method are based on the discovery that the butterfly twin yield shows a maximum value when the molar ratio of barium oxide to titanium dioxide in the starting barium titanate powder is at 1.20 to 1.25, regardless of its particle size.

A stoichiometric barium titanate is represented by unity of said molar ratio. The starting barium titanate powder with said molar ratio higher or lower than unity is prepared by firing a mixture of barium carbonate and titanium dioxide in a desired molar ratio at 1200° C. to 1450° C. for one hour in air. Various compositions are set forth in Table I. An X-ray powder identification indicates that compositions with the molar ratio higher or lower than unity exist in two phases of barium titanate and barium orthotitanate, $Ba_3TiO_4$, or in two phases of barium titanate and barium dititanate, $BaTi_2O_5$. A small amount of titanium dioxide is known to dissolve in the stoichiometric barium titanate to form a solid solution up to approximately 1 molar percent. The excess barium oxide does not dissolve in barium titanate. Firing process of the mixture of barium titanate with excess barium oxide or titanium dioxide is necessary to control the yield. A mixture of stoichiometric barium titanate powder and barium oxide powder is prepared by using a per se conventional technique such as ball-milling in such manner that the molar ratio of barium oxide to titanium dioxide in the mixture is 1.25. The mixture subjected to no pre-firing does not produce a higher yield than the stoichiometric powder but the mixture pre-fired can produce a higher yield. Therefore, it is substantially necessary for increasing the twin yield that the barium titanate powder with excess barium oxide be fired at 1200° C. to 1450° C. prior to introducing into the flux. It is not presently certain why the composition of the starting powders and prefiring process affect the yield of twin crystals. Yields of the butterfly twin are given in Table I in connection with the said molar ratio.

TABLE I

| Sample No | 1 | 2 | 3 | 4 | 5 | 6 | 7 | 8 | 9 | 10 | 11 | 12 |
|---|---|---|---|---|---|---|---|---|---|---|---|---|
| Molar ratio ($BaO/TiO_2$) | 0.5 | 0.67 | 0.83 | 0.95 | 1.0 | 1.05 | 1.1 | 1.2 | 1.25 | 1.5 | 1.75 | 2.0 |
| Yield of twin crystals | 10 | 20 | 100 | 125 | 130 | 135 | 150 | 180 | 180 | 130 | 120 | 80 |
| Mean hypotenuse length (mm.) | 1.0 | 1.2 | 1.5 | 2.0 | 4.0 | 4.0 | 4.5 | 6.0 | 6.0 | 4.5 | 4.0 | 3.5 |

The data of Table I are obtained in the following manner:

The sample powders are prepared by air-firing of the mixtures of barium carbonate and titanium dioxide in a desired molar ratio at 1300° C. for 1 hour. Thirty grams of the powder are placed in the bottom of a platinum crucible, 5 cm. in diameter and 5 cm. in height. Seventy grams of potassium fluoride are added to the crucible and then the crucible covered with a lid is heated to 1150° C. and kept at this temperature for 4 hours. The crucible and the contents are then cooled at a rate of 50 degrees per hour until a temperature of approximately 900° C. is attained. The flux, which is still in a liquid state, is decanted at 900° C. and then the crucible and the contents are allowed to cool to room temperature (about 20° C. to about 30° C.) at a rate of 60 degrees per hour. A small amount of the solidified flux adhering to the surface of the crystals is removed by washing with water. Then twin yields are determined by counting the twin crystals grown in the crucible and are shown in Table I.

Referring to Table I, the yield of twin crystals clearly decreases with a decrease in the molar ratio, whereas it ranges from 130 to 180 at the molar ratio of 1.0 to 1.25 and decreases to 80 with an increase in the molar ratio above 1.25. It will be understood that the yield of twin crystals is lowered by employing barium titanate with an excess of titanium dioxide and is elevated by employing barium titanate with an excess of barium oxide. The maximum twin yields (approximately 180) are obtained with the aforesaid molar ratio of 1.20 to 1.25 as indicated in Table I. The barium titanate butterfly crystals always exist in the molar ratio of unity, regardless of the variation in the molar ratio of the starting powders.

Referring to Table I, twin crystals from Samples 8 and 9 are liable to contact with each other because of their large population density and to have an average common edge of approximately 6 mm. The butterfly twins from samples other than Samples 8 and 9 have an average common edge of 4.5 mm. or shorter in spite of their small population density. The excess titanium dioxide in the fired starting powders clearly retards the growing rate, whereas the excess barium oxide in the fired starting powders promotes the growing rate and gives a maximum rate at 1.20 to 1.25 of the molar ratio. It will be apparent from Table I that twin crystals obtained from Samples 1 to 4 having excess titanium dioxide are smaller in size than those from Samples 6 to 12 having excess barium oxide.

A proper population density, i.e. number of crystals per unit area of crucible, is preferred for producing large twin crystals without deterioration due to their contact. It has been found according to the present invention that the population density is readily controlled by employing two kinds of barium titanate powders in different compositions; one has the molar ratio smaller than unity and is characterized by a low yield of twin crystals and the other has the molar ratio higher than unity and is characterized by a high yield of twin crystals. A mixture of these different barium titanate powders in a proper weight percentage can control the butterfly twin population density. As the crystal nuclei are in a smaller number and their growing rate becomes higher, the nuclei can grow into larger crystals during the cooling process. It is desirable to produce large barium titanate twin crystals in view of their application in an electronic device.

The powder having the molar ratio of 1.20 and 1.25 gives a maximum twin yield and the common edge of the crystals grown is approximately 6 mm. in an average length. Barium titanate twins having a common edge of approximately 10 mm. can be produced in a high yield by employing a population density of one per approximately (0.7 cm.)² according to this invention.

Although the barium titanate with an excess of titanium dioxide defined by the molar ratio of 0.67 to 0.80 can produce yield of 40 to 50 as shown in the Table I, the crystals so produced are in a small size due to a low growing rate. Therefore, no large crystal can be obtained by employing only the barium titanate with an excess of titanium dioxide. According to the present invention, larger crystals in a high yield can be produced by employing a combination of above said barium titanate with an excess of titanium dioxide and that with an excess of barium oxide which is characterized by a high yield and a high growing rate of twin crystal.

Operable mixing ratio of the two kinds of powder is 50 to 80 weight percent of barium titanate wherein the molar ratio of barium oxide to titanium dioxide is 0.60 to 0.85, and 20 to 50 weight percent of barium titanate wherein the molar ratio of barium oxide to titanium dioxide is 1.0 to 1.5. Preferable mixing ratio is 60 to 70 weight percent of barium titanate wherein the said molar ratio is 0.65 to 0.75 and 30 to 40 weight percent of barium titanate wherein the said molar ratio is 1.10 to 1.25.

Example

Sample No. 8 powder is admixed with Sample No. 2 powder in the desired weight percent. The crystal growing is carried out in the same way as that described above. Thirty grams of the said mixed powder are charged in the platinum crucible of 5 cm. diameter and 5 cm. height and the mixed powder is covered with 70 grams of potassium fluoride. The crucible covered with a lid is heated in a furnace at a rate of 200° C. per hour and maintained at 1150° C. for 4 hours. The results obtained are given in Table II.

TABLE II

| Sample No. | Weight Percent | | Yield of Crystals | Mean Hypotenuse Length (mm.) |
|---|---|---|---|---|
| | Sample No. 8 | Sample No. 2 | | |
| 13 | 15 | 85 | 28 | 4.5 |
| 14 | 30 | 70 | 28 | 10.5 |
| 15 | 40 | 60 | 63 | 9.5 |
| 16 | 50 | 50 | 83 | 7.5 |

Samples No. 8 and No. 2 are the same as in Table I.

The crucible and the content are cooled at a rate of 50° C. per hour until it reaches at approximately 900° C. At this temperature, the flux, which is still in the liquid state, is poured off and the power supply to the furnace is cut off. The crucible and the content are allowed to cool to room temperature. The solidified flux is removed by washing with water. Referring to Table II, 38 and 63 twins having approximately 10 mm. long side are obtained by employing Sample 14 and Sample 15, respectively. The twin crystals are in a size smaller than 10 mm. in length when Sample 13 or Sample 16 is employed.

It should be understood that the examples described above are intended to be illustrative of the present invention. Variations may be made therein within the skill of the art without departing from the spirit and scope of the invention.

What is claimed is:

1. The process of producing butterfly twin crystals of barium titanate in a large size comprising the steps of adding barium titanate powder to a flux material which is a solvent therefor, heating the mixture of barium titanate and flux to an elevated temperature to form a melt, maintaining the said mixture at the said elevated temperature for a period of time during which a portion of the barium titanate dissolves, the ratio of barium titanate to flux in said mixture being greater than the solubility limit of barium titanate in the flux material at the said elevated temperature, and cooling the melt to promote the crystal growth, the said barium titanate powder comprising (a) 50 to 80 weight percent of barium titanate wherein the molar ratio of barium oxide to titanium dioxide is 0.60 to 0.85 and (b) 20 to 50 weight percent of barium titanate wherein the molar ratio of barium oxide to titanium oxide is 1.0 to 1.5.

2. The process according to claim 1, wherein the said barium titanate powder comprises (a) 60 to 70 weight percent of barium titanate wherein the molar ratio of barium oxide to titanium dioxide is 0.65 to 0.75 and (b) 30 to 40 weight percent of barium titanate wherein the said molar ratio is 1.10 to 1.25.

3. A mixture consisting essentially of (a) 50 to 80 weight percent of barium titanate wherein the molar ratio of barium oxide to titanium dioxide is 0.60 to 0.85 and (b) 20 to 50 weight percent of barium titanate wherein the molar ratio of barium oxide to titanium oxide is 1.0 to 1.5.

4. A mixture according to claim 3 consisting essentially of (a) 60 to 70 weight percent of barium titanate wherein the molar ratio of barium oxide to titanium dioxide is 0.65 to 0.75 and (b) 30 to 40 weight percent of barium titanate wherein the said molar ratio is 1.10 to 1.25.

References Cited

UNITED STATES PATENTS

| | | | |
|---|---|---|---|
| 2,803,519 | 8/1957 | Karan | 23—51 |
| 2,852,400 | 9/1958 | Remeika | 106—39 |
| 2,992,079 | 7/1961 | Linares et al. | 106—39 X |

HELEN M. McCARTHY, *Primary Examiner.*

W. R. SATTERFIELD, *Assistant Examiner.*